(12) United States Patent
Luetze et al.

(10) Patent No.: US 7,044,524 B2
(45) Date of Patent: May 16, 2006

(54) VEHICLE COVERING PART AND METHOD OF FITTING IT

(75) Inventors: Thomas Luetze, Eutingen im Gaeu (DE); Scott Schrauben, Lyons, MI (US)

(73) Assignees: DaimlerChrysler AG, Stuttgart (DE); Lacks Enterprises, Inc., Grand Rapids, MI (US)

( * ) Notice: Subject to any disclaimer, the term of this patent is extended or adjusted under 35 U.S.C. 154(b) by 42 days.

(21) Appl. No.: 10/678,643

(22) Filed: Oct. 6, 2003

(65) Prior Publication Data

US 2005/0073163 A1   Apr. 7, 2005

(51) Int. Cl.
    *B62D 39/00*    (2006.01)
(52) U.S. Cl. ............... 296/1.08; 293/128; 52/716.6
(58) Field of Classification Search ............... 296/1.08; 280/848, 153.4, 154, 850; 293/128; 52/716.5, 52/716.6, 716.7
See application file for complete search history.

(56) References Cited

U.S. PATENT DOCUMENTS

| 4,592,937 | A | * | 6/1986 | Nagata et al. ............... 293/128 |
| 4,709,525 | A | * | 12/1987 | Adell ............... 293/128 |
| 5,238,268 | A | * | 8/1993 | Logan ............... 280/154 |
| 5,340,154 | A | * | 8/1994 | Scott ............... 280/154 |
| 5,353,571 | A | * | 10/1994 | Berdan et al. ............... 52/716.5 |
| 6,681,543 | B1 | * | 1/2004 | Nada et al. ............... 52/716.5 |
| 2004/0061348 | A1 | * | 4/2004 | Takeda et al. ............... 296/1.08 |
| 2005/0005565 | A1 | * | 1/2005 | McSharry et al. ............... 52/716.5 |

FOREIGN PATENT DOCUMENTS

DE       198 24 720 C1     6/1998

* cited by examiner

*Primary Examiner*—Jason Morrow
(74) *Attorney, Agent, or Firm*—Crowell & Moring LLP (57) ABSTRACT

The vehicle covering part (10) is provided with a snap-in connecting system (12). Provision is made here for the vehicle covering part (10) to have a support element (14) which can be fastened to the vehicle with a cohesive material joint, and a visible element (16) which can be connected to the support element (14) by snapping it in place.

Furthermore, a method for fitting the vehicle covering part (10) to a vehicle body (18) is provided. The method is distinguished in that at least one layer of glue (22) is applied to that side (20) of the support element (14) which is for fastening to the vehicle, the support element (14) is bonded onto the vehicle body (18) in a stable position by means of the layer of glue (22), and the visible element (16) is then fixed on the support element (14) with the formation of a defined snap-in connection.

20 Claims, 6 Drawing Sheets

VEHICLE COVERING PART AND METHOD OF FITTING IT

BACKGROUND AND SUMMARY OF THE INVENTION

The invention relates to a vehicle covering part having a snap-in connecting system, and to a method for fitting the vehicle covering part to a vehicle body.

Vehicle covering parts of the generic type mentioned above are known, for example, German patent document DE 198 24 720 C1, which discloses a composite profile, such as a trim strip of a motor vehicle. The composite profile contains a band-shaped support which constitutes the visible part. Inserted on the rear side of the support is a rail that is made from polymeric material and has outwardly protruding retaining clips are integrally moulded thereon. The retaining clips are used to fasten the composite profile into correspondingly designed openings in the motor vehicle body.

One object of the present invention is to provide an alternative vehicle covering part, and a method for fitting it to a vehicle body.

This and other objects and advantages are achieved by the vehicle covering part according to the invention, which has a support element that can be fastened to the vehicle with an adhesive material joint. A visible element can then be connected to the support element by snapping it in place. This makes possible a rapid fastening of outer add-on parts (vehicle covering part) to body shell support structures (vehicle body) without having to make material changes to the particular vehicle body, for example in the form of sockets or recesses. The support element can be fastened particularly precisely to the vehicle with an adhesive material joint while the visible element can be connected in an installation-friendly and positionally defined manner to the support element by snapping it in place.

The vehicle covering part can be designed in at least two parts, with the support element and/or the visible element each being a single part, or they may consist of a plurality of components. Even a multi-part support element can be fastened relatively easily to a vehicle with an adhesive material joint, with predetermined positional tolerances being satisfied. If appropriate, individual parts of the support element may also be spaced apart from one another.

The support element can advantageously be fastened to a vehicle body with an adhesive material by means of a glued joint. Glued joints can be realized in vehicle body manufacturing in a particularly installation-favorable and positionally precise manner with existing connection requirements being satisfied.

According to a preferred embodiment, the support element has at least one layer of glue on its side for fastening to the vehicle. It is thus not necessary for any complex, connection-preparing measures to be undertaken on the vehicle body, since, within the context of preparing for installation, the support element has merely to be provided with a layer of glue, such as for example, a double-sided adhesive tape. An adhesive tape of this type can be attached relatively simply to that side of the support element which is for fastening to the vehicle and at the same time ensures the production of a reliable fastening of the support element to the vehicle with an adhesive material joint. In comparison with a liquid adhesive, an adhesive tape can be used advantageously in an assembly line, since the required fixing times are relatively short.

The visible element preferably contains a plurality of snap-in projections which are spaced apart from one another, and the support element contains a corresponding plurality of snap-in sockets arranged in a complementary manner. This makes possible a reliable snap-in connection between the visible element and the support element. The vehicle covering part is thus designed as two shells, it being possible, if appropriate, for each shell to consist of a plurality of individual parts. In this case, the glued joint providing an adhesive material joint constitutes a first installation stage and the snap-in connection constitutes a second installation stage. After the support element has been fastened to the vehicle with an adhesive material joint, with existing positional tolerances being ensured, the visible element can be fastened in accordance with the sequential component principle likewise in a positionally precise manner by means of a snap-in connection to the support element and therefore to the vehicle. The support element thus constitutes a guiding component for the visible element.

The snap-in projections and the snap-in sockets are advantageously arranged in a central overlapping region on the respective snap-in connecting side of the visible element and of the support element. This makes it possible to arrange the snap-in connections in a concealed manner with respect to the visible side of the visible element and at the same time to ensure a favorable snap-in connection with regard to positioning the visible element correctly relative to the support element and to the vehicle. To this end, snap-in connecting points lying in a spatially offset manner with respect to one another in the overlapping region can be provided.

The snap-in sockets preferably form passage openings and are recessed with respect to the side of the support element which is to be fastened to the vehicle. This makes it possible to design that side of the support element to be essentially planar, so that no outwardly extending projections of the support element make it necessary for the vehicle body to be designed with a correspondingly complementary geometry.

The support element is advantageously provided on its snap-in connecting side with a surface structure which increases the stiffness, thereby ensuring that the visible element is positioned sufficiently precisely relative to the support element. Since the support element has the function of a guiding component with respect to the visible element, great stiffness of the support element is of particular importance in order to ensure a vehicle covering part which can be fitted in a reproducibly precise manner. The surface structure is preferably of planar design, so that the support element can be pressed in an easily maneuverable manner on its snap-in connecting side against the vehicle in order to form the adhesive material joint.

In one embodiment of the invention, the support element is provided on its snap-in connecting side with at least one protruding receiving rail in which the snap-in sockets are arranged in a completely integrated manner. In this case, the receiving rail can be used at the same time as a surface structure which increases the stiffness. Furthermore, the receiving rail can be used as a press-on surface extending in essentially planar manner, for producing the adhesive material joint.

In a preferred embodiment, the support element has, on its snap-in connecting side, at least one bearing contact surface which directs and centers the visible element into a defined installation position. A bearing contact surface of this type may, for example, be an outer edge of the support element, with which the visible element comes into bearing contact (over at least part of the circumference) when taking up a defined installation position. In this case, the bearing contact surface can be directed obliquely outwards in the installation direction of the visible element in order to help center the visible element when producing the snap-in connection.

The bearing contact surface of the support element is preferably used to bring about a position-stabilizing prestress of the visible element when it is in the installation position and has been snapped in place. This ensures that the visible element is positioned relative to the support element and to the vehicle body in a sufficiently precise manner, which is reproducible in terms of position and/or shape. If appropriate, a sliding layer can be provided between the contact surfaces of the visible element and of the support element. Such a sliding layer (for example, due to different thermal expansions of the two elements connected to each other) promotes a movement of the visible element relative to the support element in the region of the bearing contact without the obtained, position-stabilizing prestress of the visible element having to be cancelled as a result. In particular, the relative longitudinal movement of the visible element can be promoted by interconnection of a sliding layer while the visible element remains prestressed in its transverse direction. The sliding layer can be bonded, for example, onto suitable bearing contact surfaces of the support element in the form of a tape.

The snap-in connections on that side of the support element which is for fastening to the vehicle can preferably be undone by means of a resilient movement of the snap-in projections and/or of the snap-in sockets. This makes it relatively simple to exchange a visible element on the vehicle without having to detach the support element from the vehicle body. The snap-in connection is, however, to be designed to be stiff in such a manner that undesired detachment of the visible element from the support element can be virtually ruled out.

Advantageously, the support element is completely shielded by the visible element towards the visible side. Apart from satisfying aesthetic requirements made of the vehicle covering part, this is of significance for protecting the support element and also, in particular, the connecting regions of the vehicle covering part against external influences.

In another embodiment of the invention, an edge on the visible side of the visible element lies flush against an edge on the fastening side of the support element. The edge on the visible side can be used to bring about a position-stabilizing prestress of the visible element when it is in the installation position and has been connected by having been snapped in place. In particular, the position of the edge on the visible side of the visible element is of importance for obtaining an adequately constant gap profile between the visible element and the vehicle body.

According to another embodiment, the edge on the visible side of the visible element protrudes over the edge on the fastening side of the support element and shields the same on the visible side. In this case, the edge on the visible side of the visible element may, if appropriate, be spaced apart from the vehicle body with a sufficiently precise and, in particular, constant gap height being ensured.

That side of the support element which is for fastening to the vehicle advantageously has an automatically centering surface contour. The surface contour may, for example, be of V-shaped design in cross section, with the vehicle body having to have a connecting region having a complementary surface contour. A surface contour of this type does not constitute any impairment to producing a precise and correct cohesive material joint between the support element and the vehicle body; rather, on account of the additional, form-fitting connection, it assists a rapid and reproducibly precise fastening of the support element to the vehicle body.

The vehicle covering part may be an outer visible part on the vehicle body and, in particular, an outer covering part on the wheel well edge. Components of this type or similar components of a vehicle are subject to particularly exacting demands with regard to permissible positional and/or shape tolerances and fastening stability with, at the same time, easy installation.

The support element and/or the visible element can be produced from plastic or from another suitable material. The combination of a glued joint and a snap-in connection for fastening the vehicle covering part to a vehicle body is not critical for obtaining satisfactory installation results when different materials are used.

Furthermore, in the method according to the invention, at least one layer of glue is applied to that side of the support element which is for fastening to the vehicle, the support element is bonded onto the vehicle body in a stable position by means of the layer of glue. The visible element is then fastened onto the support element with a defined snap-in connection being formed. This method can be realized within the scope of installation which can be carried out in an assembly line and is suitable for the rapid and reliable fitting of a vehicle covering component to a vehicle body. Complex structural changes to the vehicle body, in particular in the form of fastening recesses, do not necessarily have to be provided for this purpose.

The layer of glue in the form of a double-sided adhesive tape is advantageously pressed onto that side of the support element which is for fastening to the vehicle. Such a layer of glue can be attached to the support element in a precise position in a manner which is particularly easy to handle and can be reproduced.

Advantageously, the vehicle covering component is mounted in at least partially automated series installation, which may be performed, for example, by one or more handling systems in the form of a robot.

Other objects, advantages and novel features of the present invention will become apparent from the following detailed description of the invention when considered in conjunction with the accompanying drawings.

DETAILED DESCRIPTION OF THE DRAWINGS

Figure 1:
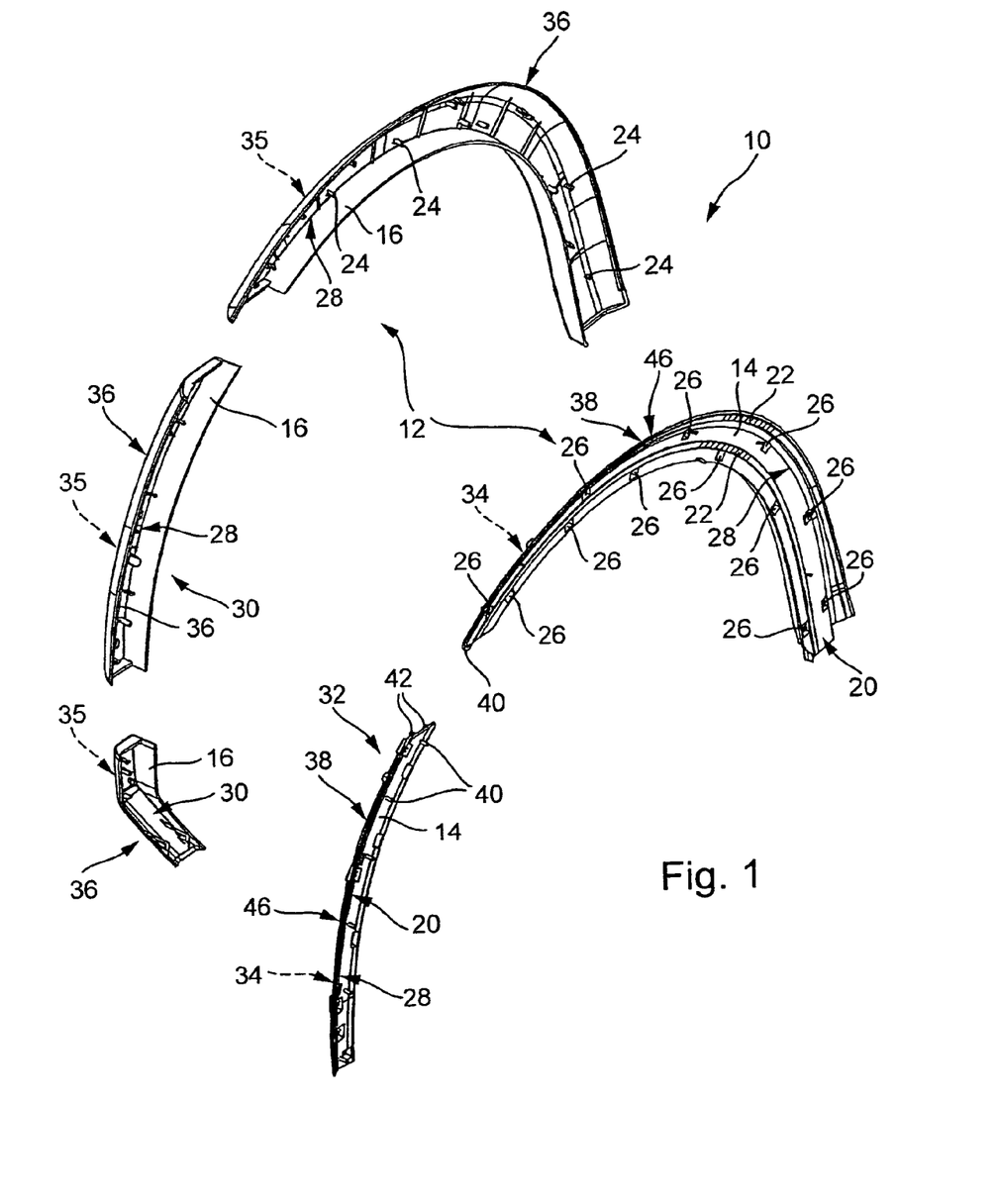
FIG. 1 is an exploded perspective view of a vehicle covering part according to the invention.
Figure 2:
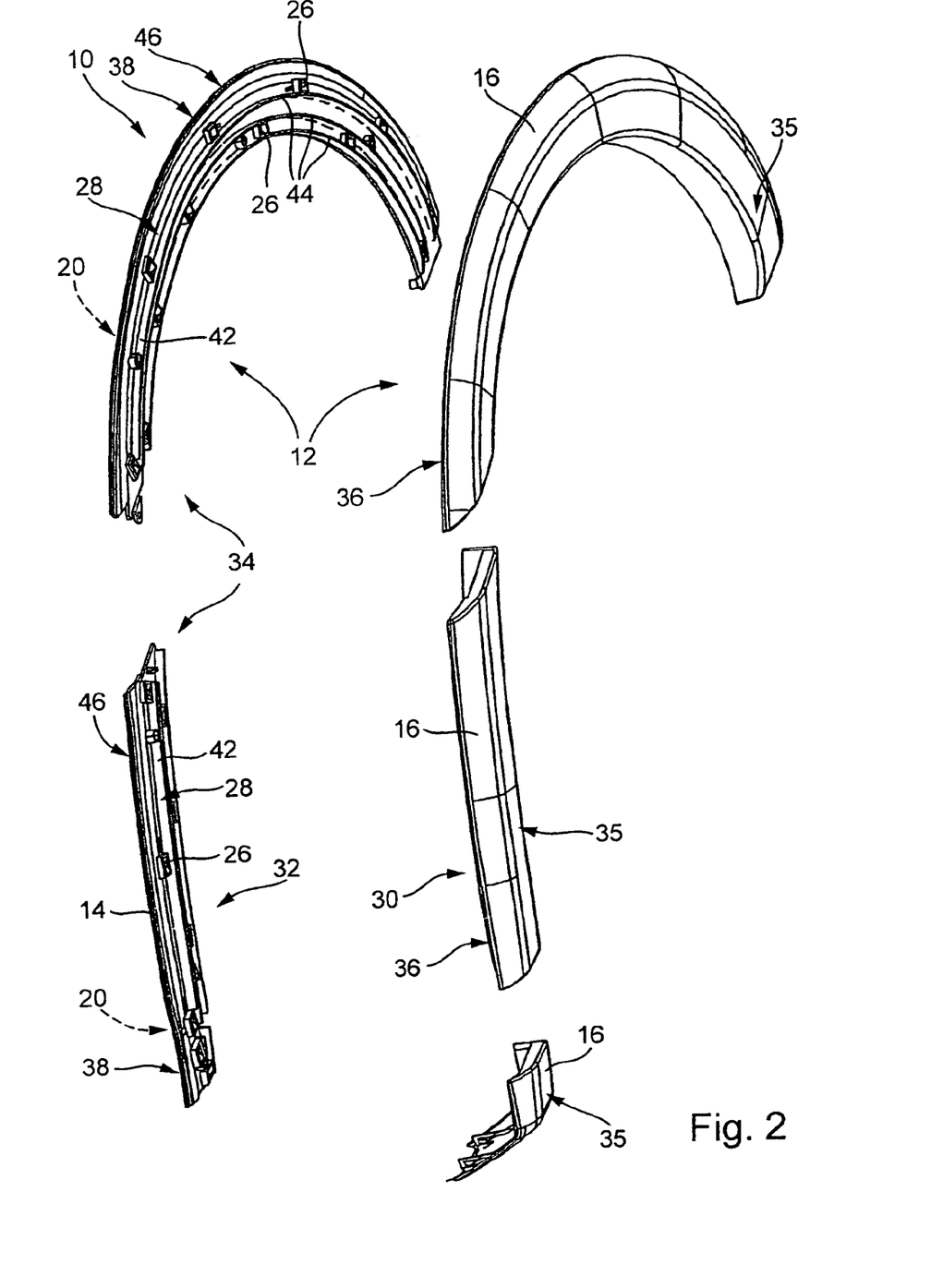
FIG. 2 is a further exploded perspective view of the vehicle covering part from FIG. 1.

FIGS. 1 and 2 show a vehicle covering part 10 according to the invention in schematic, perspective exploded illustration. FIG. 1 illustrates the respective inner sides of a support element 14 and of a visible element 16 of the vehicle covering part 10 while FIG. 2 shows their corresponding outer sides (visible side 35 of the visible element 16 and visible side 34 of the support element 14). The visible element 16 and the support element 14 can be connected to each other by means of a snap-in connecting system 12. According to the first exemplary embodiment illustrated in FIGS. 1 and 2, the support element 14 is designed in two parts and the visible element 16 is designed in three parts. The support element 14 has a side 20 which is for fastening to the vehicle and at which the said support element can be connected with an adhesive material joint to a vehicle body (not illustrated in FIGS. 1 and 2). Furthermore, the support element 14 contains a snap-in connecting side 32 on which a plurality of snap-in sockets 26 are arranged spaced apart from one another. The snap-in sockets 26 are designed as passage openings and therefore also extend as far as the side 20 for fastening to the vehicle. Accordingly, the visible element 16 has, on its snap-in connecting side 30, a plurality of complementarily arranged snap-in projections 24. The snap-in projections 24 and the snap-in sockets 26 are respectively arranged in a central overlapping region 28 on the snap-in connecting side 30 of the visible element 16 and on the snap-in connecting side 32 of the support element 14. The snap-in projections 24 and the snap-in sockets 26 therefore together form snap-in connecting points which, in the illustrated embodiment, are arranged spatially offset with respect to one another in the overlapping region 28. The support element 14 is completely shielded on its visible side 34 by the fitted visible element 16 (also see FIG. 3).

Figure 3:
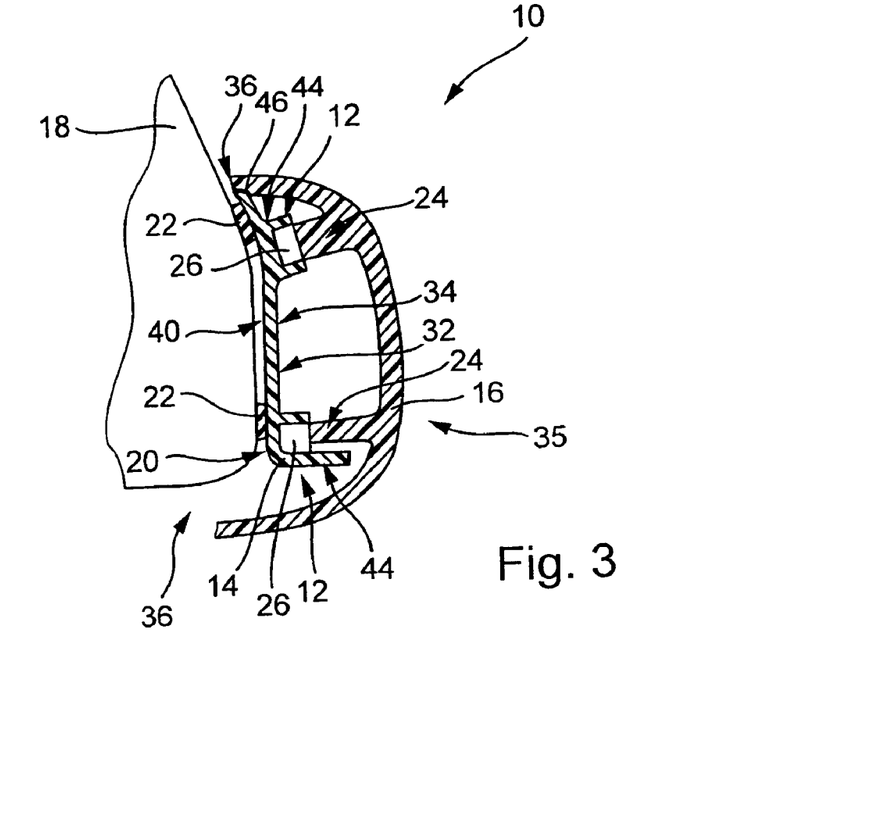
FIG. 3 is a schematic cross-sectional view through a fitted vehicle covering part in FIG. 1, on an enlarged scale.

As emerges, in particular, from the schematic cross-sectional illustration of FIG. 3 of the fitted vehicle covering part 10, the support element 14 is completely shielded towards its visible side 34 by the fitted visible element 16. The visible element 16 has an edge 36 which is on the visible side and which bears in some regions (at the top in FIG. 3) flush against an edge 38 which is on the snap-in connecting side of the support element 14 (also see FIG. 4). This bearing contact surface 46 of the support element 14 and the corresponding contact surface of the edge 36 on the visible side of the visible element 16 are of angular design in a complementary manner with respect to each other. Provided between the two contact surfaces is a sliding layer 50 which is in the form of a sliding tape and permits and assists a relative movement between the visible element 16 and the support element 14 (for example as a consequence of thermal stresses) in particular in the longitudinal direction of the vehicle covering part 10. As can be seen in particular in FIG. 4, the edge 36 on the visible side of the visible element 16 protrudes over the edge 38 on the fastening side of the support element 14, with the result that the support element 14 is virtually completely shielded to the outside by the visible element 16. According to FIGS. 3 and 4, the support element 14 is connected to a vehicle body 18 with an adhesive material joint by means of a plurality of layers of glue 22 in the form of double-sided adhesive tapes. The support element 14 is provided on its side 20 which is for fastening to the vehicle with an automatically centering surface contour 40 which, according to the exemplary embodiment illustrated, has a V-shaped contour in cross section. The vehicle body 18 is of complementary design in this connecting region to the surface contour 40 of the support element 14. The support element 14 is provided, on its snap-in connecting side 32, with two outwardly protruding receiving rails 44 in which the snap-in sockets 26 are completely integrated and arranged in a recessed manner.

Figure 4:
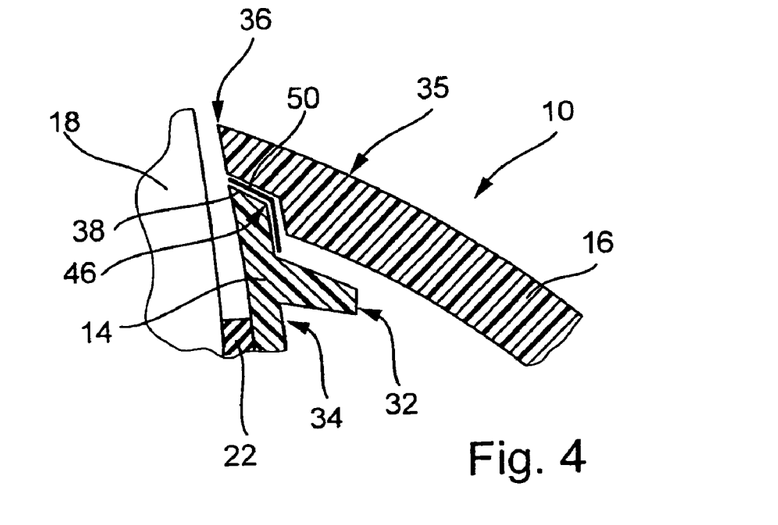
FIG. 4 is a detail of the vehicle covering part from FIG. 3, on an enlarged scale.
Figure 5:
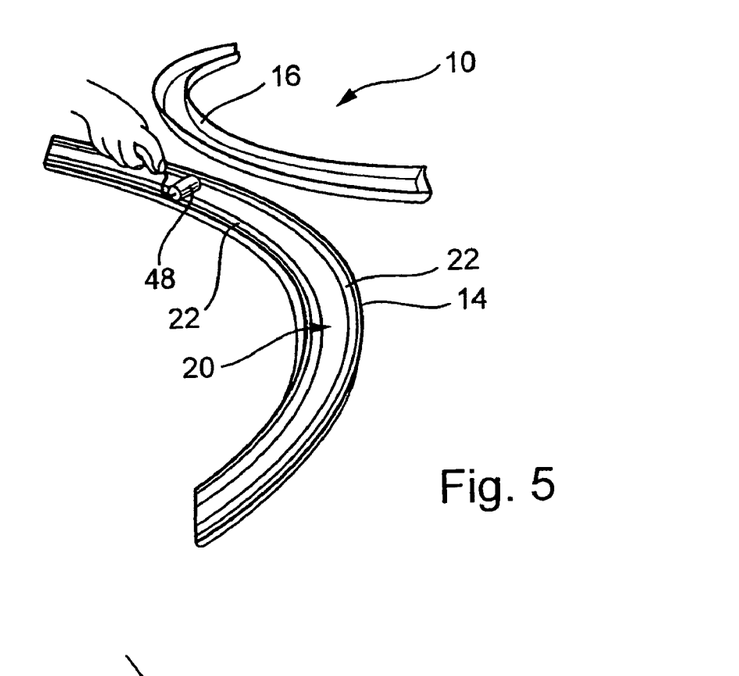
FIG. 5 is a vehicle covering part according to an alternative embodiment during a first, manual installation step.
Figure 6:
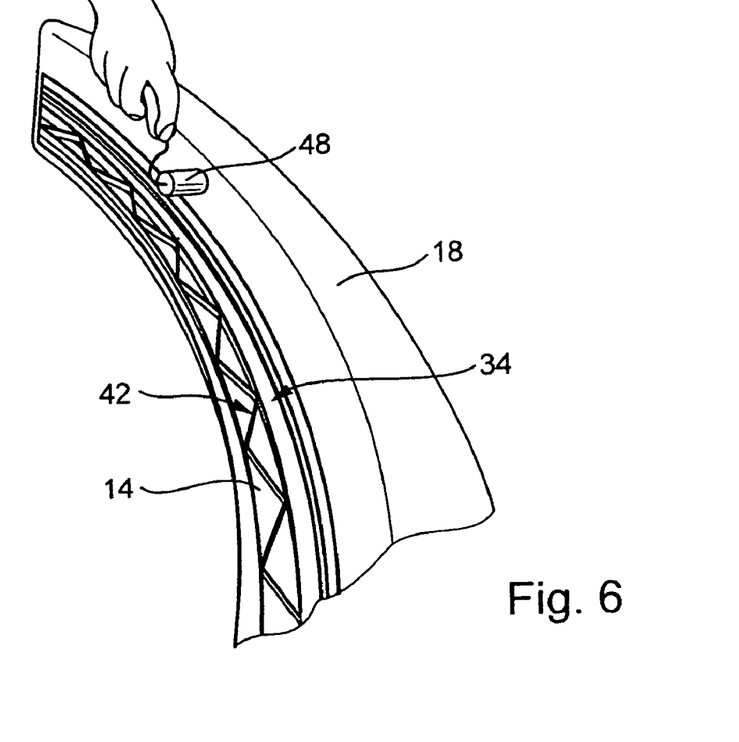
FIG. 6 shows the support element of the vehicle covering part from FIG. 5 during a second, manual installation step.

The edge 38 on the fastening side of the support element 14 is therefore designed as a bearing contact surface 46 which centers the visible element 16 and directs it into a defined installation position. The bearing contact surface 46 is used to bring about a position-stabilizing prestress of the visible element 16 when it is in the installation position and has been connected by having been snapped in place. The snap-in connections between the visible element 16 and the support element 14 can be undone without being destroyed. To this end, provision is made for the snap-in sockets 26 to permit a resilient movement.

FIGS. 5 to 9 show different installation phases for attaching a vehicle covering part 10 (of alternative design) to a vehicle body 18. This involves a second exemplary embodiment of a vehicle covering part 10, which comprises a single support element 14 and a single visible element 16. First of all, the layers of glue 22 in the form of double-sided adhesive tapes are applied to that side 20 of the support element 14 which is for fastening to the vehicle. The adhesive tapes 22 are pressed, for example manually by means of a roller 48, against the support element 14 in designated regions with a stable glued joint being formed. This is preparation for installation of the support element 14 which is provided with the necessary layers of glue 22 (see FIG. 5). According to FIG. 6, the prepared support element 14 is subsequently pressed, likewise manually by means of compressive stress exerted by the roller 48, on its side 20 for fastening to the vehicle against the vehicle body 18 with the layers of glue 22 being connected in between and is thus connected to the said vehicle body with an adhesive material joint.

Figure 7:
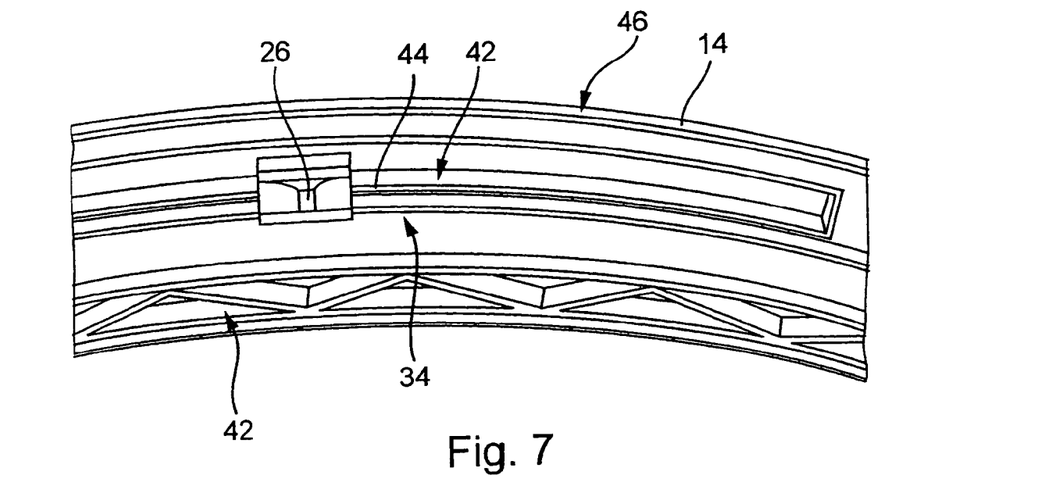
FIG. 7 shows the snap-in connecting side of the support element from FIG. 6, on an enlarged scale.

As can be seen in FIG. 7, the receiving rails 44 are designed to be essentially planar for this purpose, with the result that an installation-friendly pressing of the support element 14 against the vehicle body 18 by means of the roller 48 is possible. The support element 14 is furthermore provided with a surface structure 42 which ensures sufficient stability of the support element 14. In this case, the snap-in sockets 26, which are designed as passage openings, are arranged in a completely recessed manner in the associated receiving rail 44, and thus do not constitute any obstruction to the pressing of the support element 14 against the vehicle body 18 by means of the roller 48; on the contrary, they even exert a stabilizing action on the support element 14.

Figure 8:
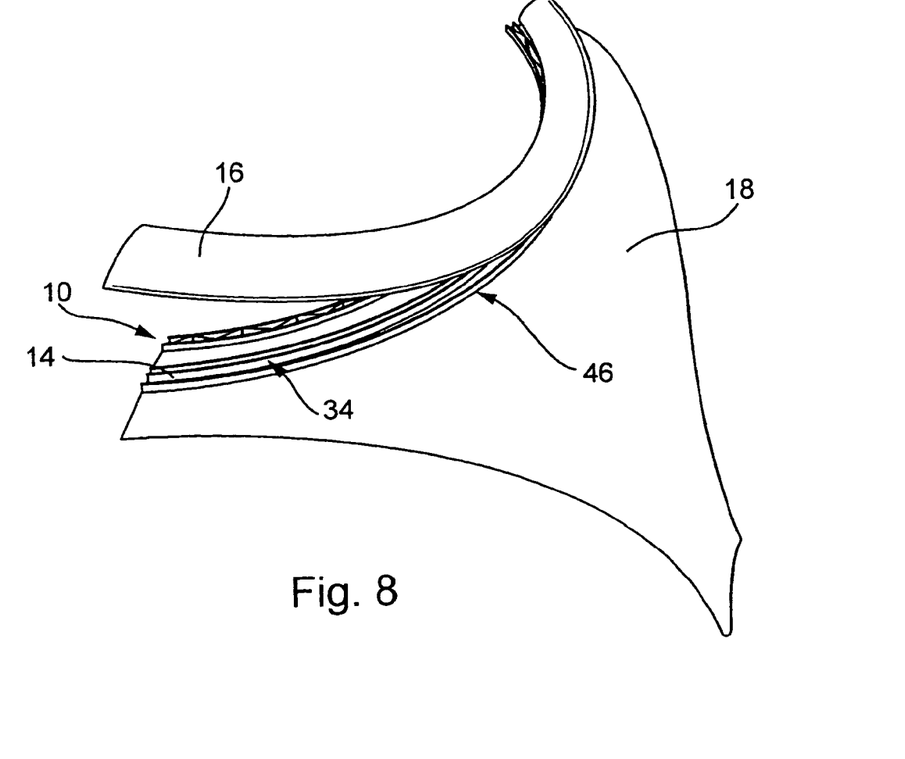
FIG. 8 shows the vehicle covering part from FIG. 5 during a third, manual installation step.
Figure 9:
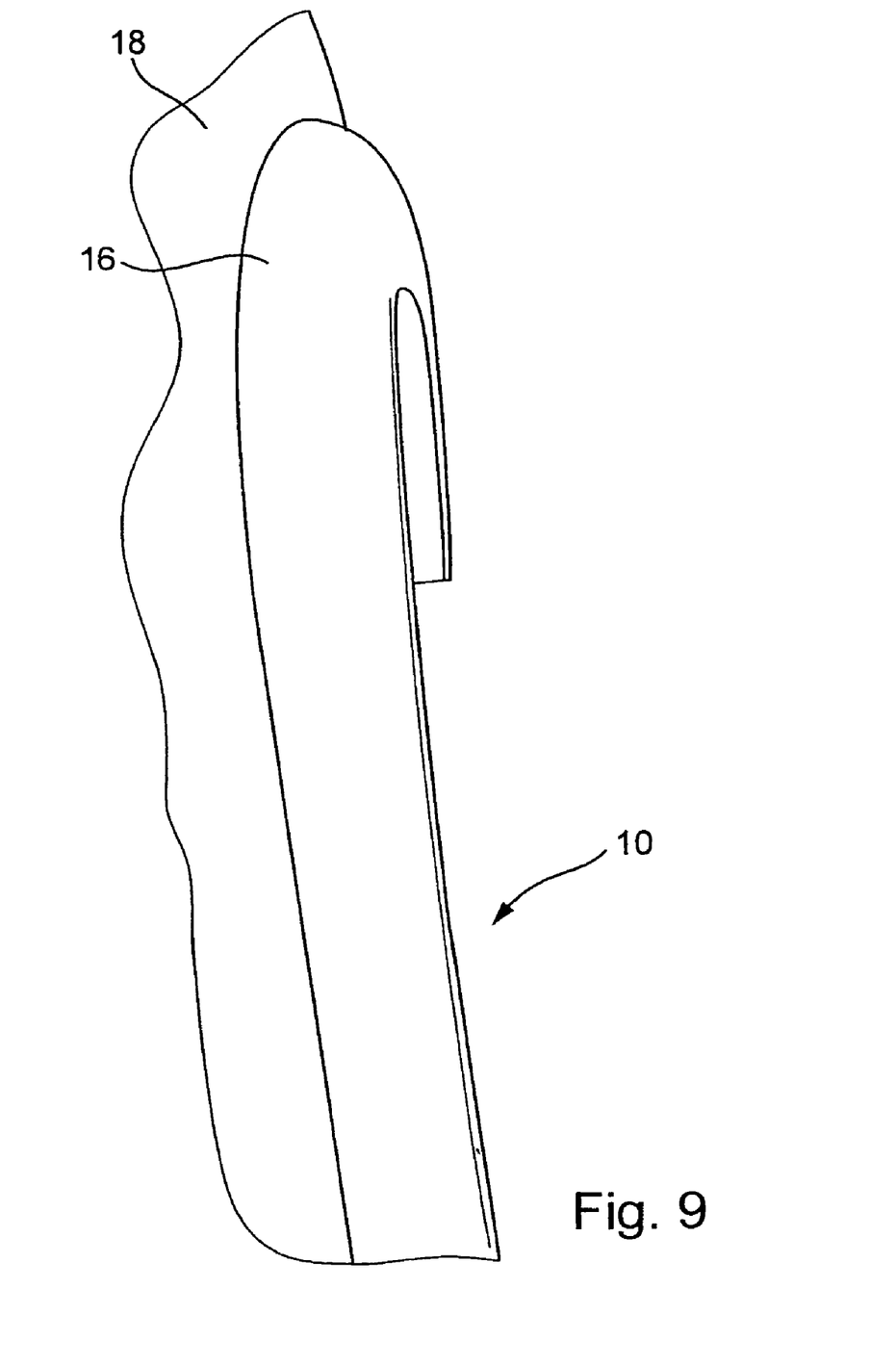
FIG. 9 shows the vehicle covering part from FIG. 5 completely fitted on a vehicle body, in a schematic outside view.

As shown in FIG. 8, the visible element 16 is fastened to the support element 14 with a defined snap-in connection being formed. The clamping forces, which occur with the snap-in connection between the support element 14 and the visible element 16, are supported globally in the vehicle covering part 10 by the support element 14. In this case, the visible element 16 is offset by means of the bearing contact surface 46 of the support element 14, which is bonded in a stable position on the vehicle body 18, under prestress, in particular in the transverse direction, when the snap-in connection is formed, and is thereby stabilized in position. This working step may, for example, also take place manually. The vehicle covering part 10 which is fitted to the vehicle body 18 is distinguished, according to FIG. 9, by a positionally and dimensionally stable visible element 16, with the gap between the visible element 16 and the vehicle body 18 being advantageously defined on the visible side and preferably being of uniform design.

As an alternative to the manual installation of the vehicle covering part 10, an automated series installation of this component may also be envisaged. The vehicle covering part 10 is an outer visible part on the vehicle body in the form of an outer covering part on the wheel house edge, but other components of a vehicle can be designed and fitted in a corresponding manner. These components (support element 14 and/or visible element 16) may be produced from plastic or from another suitable material, for example metal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle covering component, comprising
an elongate support element adapted to be fastened to the vehicle with an adhesive material joint; and
an elongate visible element which can be connected to the support element by snapping it in place; wherein,
at least one of the support element and the visible element comprises at least two discrete parts;
the support element comprises a number of parts which differs from a number of parts that form the visible elements;
each part of the support element includes a plurality of discrete attachment points distributed along a longitudinal direction thereof, for connection of said visible element; and
in an installed state of said vehicle covering component, said parts of the support element abut one another lengthwise, forming a substantially continuous support structure with said attachment points distributed along the longitudinal direction thereof.

2. The vehicle covering part according to claim 1, wherein the support element includes means for fastening it to a vehicle body with an adhesive material joint.

3. The vehicle covering part according to claim 2, wherein the support element has at least one layer of glue on its side for fastening to the vehicle.

4. The vehicle covering part according to claim 3, wherein the layer of glue is designed as a double-sided adhesive tape.

5. A vehicle covering component, comprising
a support element adapted to be fastened to the vehicle with an adhesive material joint; and
a visible element which can be connected to the support element by snapping it in place; wherein,
the visible element has a plurality of discrete snap-in projections formed at a plurality of connection points that are arranged consecutively along a longitudinal axis of the visible element, and are spaced apart from one another; and
the support element has a corresponding plurality of discrete snap-in sockets arranged in a complementary manner.

6. The vehicle covering part according to claim 5, wherein the snap-in projections and the snap-in sockets are arranged in a central overlapping region on respective snap-in connecting sides of the visible element and of the support element.

7. The vehicle covering part according to claim 5, wherein consecutive connecting points are spatially offset with respect to one another, alternatingly, in a transverse direction of the conveying part.

8. The vehicle covering part according to claim 5, wherein the snap-in sockets form passage openings and are arranged recessed with respect to that side of the support element that is provided for fastening to the vehicle.

9. The vehicle covering part according to claim 5, wherein the support element has a snap-in connecting side that is provided with a surface structure which increases stiffness.

10. The vehicle covering part according to claim 5, wherein the support element has a snap-in connecting side that is provided with at least one protruding receiving rail in which the discrete snap-in sockets are arranged longitudinally consecutively in a completely integrated manner.

11. The vehicle covering part according to claim 10, wherein the support element has, on its snap-in connecting side, at least one bearing contact surface which centers the visible element in a defined installation position.

12. The vehicle covering part according to claim 11, wherein the bearing contact surface of the support element causes position-stabilizing prestress of the visible element when it is in an installation position and is connected by having been snapped in place.

13. The vehicle covering part according to claim 8, wherein the snap-in connections on the side of the support element that is provided for fastening to the vehicle are detachable by a resilient movement of one of the snap-in projections and the snap-in sockets.

14. The vehicle covering part according to claim 5, wherein the support element is completely shielded by the visible element towards the visible side.

15. The vehicle covering part according to claim 5, wherein an edge on the visible side of the visible element bears flush against an edge on the fastening side of the support element.

16. The vehicle covering part according to claim 5, wherein an edge on the visible side of the visible element protrudes over an edge on the fastening side of the support element and shields the same on the visible side.

17. The vehicle covering part according to claim 5, wherein a side of the support element which is provided for fastening to the vehicle has an automatically centering transverse surface contour.

18. The vehicle covering part according to claim 5, wherein the covering part is an outer visible part on the vehicle body.

19. The vehicle covering part according to claim 5, wherein the covering part is an outer covering part on a wheel housing edge.

20. The vehicle covering part according to claim 5, wherein at least one of the support element and the visible element is made of plastic.

\* \* \* \* \*